UNITED STATES PATENT OFFICE.

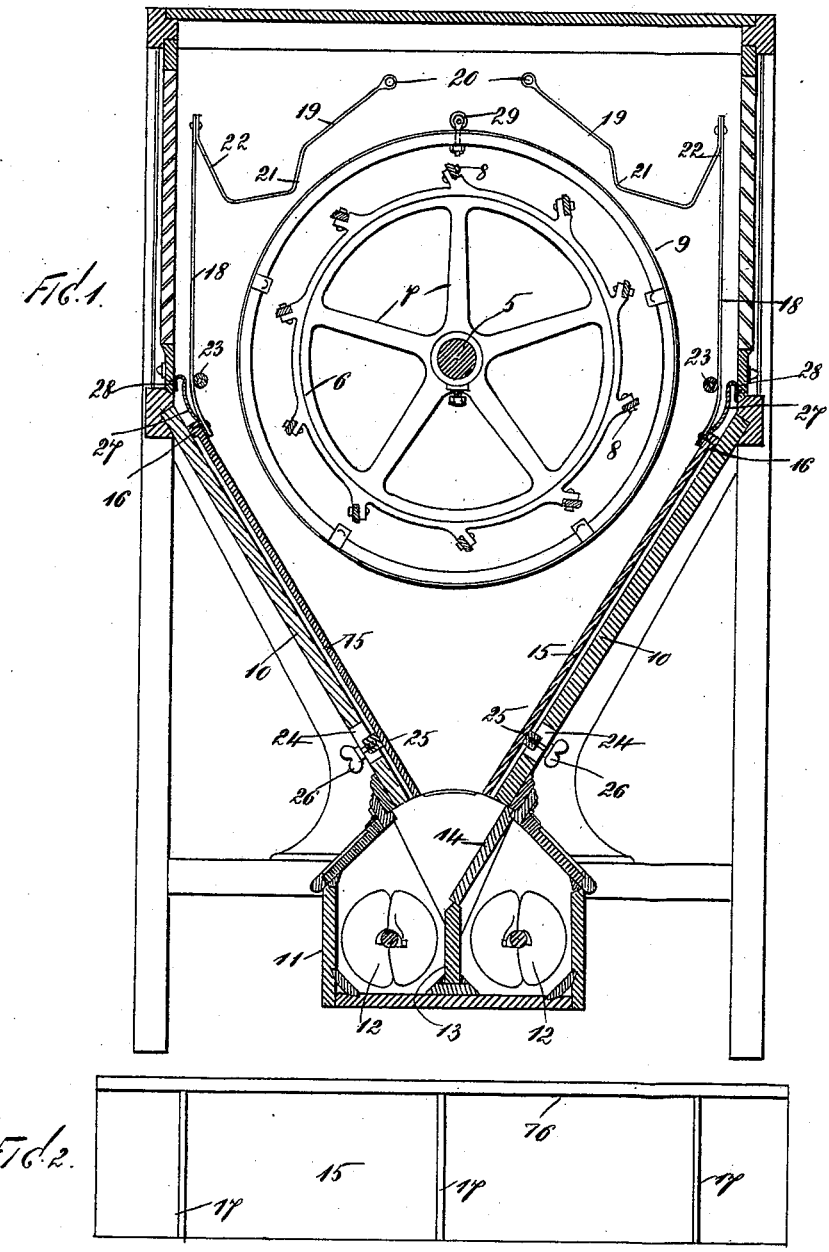

ALEXANDER BOSANKO, OF MARINER'S HARBOR, NEW YORK, ASSIGNOR OF ONE-HALF TO EDWARD JOHN DAWSON MOUNTFORD AND WILLIAM MORGAN PINDAR, OF SAME PLACE.

BOLTING-MACHINE.

SPECIFICATION forming part of Letters Patent No. 605,946, dated June 21, 1898.

Application filed March 31, 1897. Serial No. 630,102. (No model.)

*To all whom it may concern:*

Be it known that I, ALEXANDER BOSANKO, a subject of the Queen of Great Britain, (having declared my intention of becoming a citizen of the United States,) residing at Mariner's Harbor, in the county of Richmond and State of New York, have invented certain new and useful Improvements in Bolting-Machines, of which the following is a full and complete specification, such as will enable those skilled in the art to which it appertains to make and use the same.

This invention relates to machines for bolting flour, and particularly to that class thereof which operate on the principle of centrifugal force and which employ revolving wheels and inclined cant-boards by means of which the flour after passing through the reel is conducted into a conveyer.

In machines of this class it frequently happens that the reel is clogged and the proper operation of the machine prevented by reason of the flour packing on the cant-boards, and when this occurs said cant-boards are hammered on the outside thereof to dislodge the flour and the latter drops down into the conveyer or conveyers, and the chutes which lead from the conveyers are clogged by reason of the mass of flour which is discharged abruptly thereinto.

The object of the invention is to avoid these objections to bolting-machines of the class referred to as usually constructed; and the invention is fully disclosed in the following specification, of which the accompanying drawings form a part, in which the separate parts of my improvement are designated by the same numerals of reference in each of the views, and in which—

Figure 1 is a transverse section of a bolting-machine of the class referred to, the end of the reel being shown in full lines; and Fig. 2, a back view of a supplemental and movable cant-board which I employ.

In the drawings forming part of this specification, reference being made to Fig. 1, I have shown a cross-section of what is known as a "centrifugal" machine for bolting flour of the Gray type, and this machine comprises an oblong frame, a cross-section of which is shown in the drawings, and longitudinally of the upper portion of this frame is mounted a shaft 5, on which the reel is secured. This reel is circular in form and consists of annular bands 6, (one of which is shown,) spokes 7, and longitudinal plates or blades 8, which are secured to the rings or bands 7, and surrounding these plates or blades 8 is a cylindrical casing 9, which is provided with a covering of cloth, or fine-wire mesh, or any suitable material, and said cylindrical casing 9 is revoluble with the reel. Below the reel are placed the cant-boards 10, which extend downwardly and inwardly and communicate with a longitudinal casing 11, in which the conveyers 12 are placed, and between the conveyers 12 is a vertical partition 13, over which is mounted a longitudinal valve 14, which is adapted to be turned in either direction, so as to throw the flour into either of the compartments of the casing 11; and it will be understood that the machine is provided at one end of the casing 11 with a spout or spouts into and through which the flour is discharged. All these parts of the machine, as shown and described, are of well-known construction and form no part of this invention; but in machines of this class the cant-boards 10 are usually arranged quite close to the reel, and said cant-boards are stationary, and the flour when it passes from the reel drops thereon and slides downwardly into the conveyers. In this operation, however, the flour frequently packs or gathers on the cant-boards and clogs the machine and interferes with the operation of the reel, and it is necessary to pound on the outer sides of the cant-boards, so as to dislodge the flour, and when the flour is dislodged in this manner it drops downwardly into the conveyer or conveyers in large quantities and is forced into the discharge spout or spouts in such quantities as to clog the machine, and said flour also sometimes clogs the conveyers, and the chief object of this invention is to provide means for preventing the flour from lodging or packing on the cantboards in order that the passage of the flour from the machine may be regulated at all times and in order also that the operation of the reel may not be interfered with. In accomplishing this object I place on the inner sides of each of the cant-boards 10 a supplemental and vertically-movable cant-board 15, and all these supplemental and vertically-movable cant-boards are preferably composed of metal and extend the full length and breadth of the main cant-boards 10, or, in other words, they cover the entire inner surface thereof.

A back view of one of the supplemental cant-boards 15 is shown in Fig. 2 on a small scale, and these cant-boards are each provided at its upper edge with a longitudinal rib 16 and transverse ribs 17, and secured to the upper edges of each, at each end thereof, is an upwardly-directed spring-arm 18, and the upper ends of these spring-arms 18 are connected with levers 19, which are pivotally supported by the end of the frame of the machine at 20, and the levers 19 extend outwardly and downwardly and are provided with inwardly-directed curves or bends 21, which approach approximately near to the cylindrical casing 9 of the reel, and these levers are then curved outwardly and upwardly and provided with arms 22, which are secured to the arms 18, as shown in Fig. 1.

The connection between the levers 19 and the upwardly-directed spring-arms 18 of the supplemental cant-boards may be made in any desired manner; but I prefer to make this connection so that the levers may be adjusted up and down on said spring-arms, and mounted in front of the lower ends of the spring-arms 18 are rollers 23, which serve to hold said arms in proper relative position with reference to the lever 19 and the upper edges of the supplemental cant-boards. I also form, near the lower sides or edges of the main cant-board 10, slots or openings 24, and I form on or secure to the backs of the supplemental cant-boards 15 lugs or projections 25, which extend into these slots or openings and to which are secured set-screws 26, which may be manipulated from the outside of the machine, and secured to the upper edges of the supplemental cant-boards are strips 27, of canvas or other suitable flexible material, which are also secured to the frame of the machine at 28, and the object of these strips of canvas or other suitable flexible material is to prevent the flour from getting between the supplemental cant-boards 15 and the main cant-boards 10 at the upper sides thereof.

Secured to or mounted on one side of the cylindrical casing of the reel and longitudinally thereof is a roller 29, and in the operation of the machine, as said reel revolves, the roller 29 is brought in contact with the inwardly-directed bends or projections 21 of the levers 19, and at each time that one of said levers is struck by said roller the outer end thereof is thrown upwardly, and in this operation, it being understood that these levers are arranged at each end of the machine, the supplemental cant-boards will be slightly raised, say, through a space of a half-inch or inch and will at once drop back into its lowest position, and in this operation the lugs or projections 25 will strike the lower ends of the slots 24 and will bring the supplemental cant-boards to an abrupt stop. This movement of the supplemental cant-boards, which is rapidly repeated at each side of the machine, will cause the flour to slide downwardly thereover into the conveyers, and this movement of the flour will be regular at all times by reason of the fact that the up-and-down movement of the supplemental cant-boards is regular and quite rapid, the rapidity of this motion of the supplemental cant-boards being governed by the revolution of the reel, as will be readily understood. By means of this construction there is a constant and regular feed of the flour from the machine, and there is no danger of the machine becoming clogged, and this operation also improves the quality of the flour, the grade thereof being regular because of the fact that the operation of the reel is constant and unobstructed at all times.

My improvement is simple in construction and operation and is perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. A machine for bolting flour constructed as herein described, and provided with stationary cant-boards, and supplemental, movable cant-boards mounted thereon and provided with arms or projections adapted to be engaged by similar devices on the reel, whereby the said cant-boards may be reciprocated, substantially as and for the purpose described.

2. A machine for bolting flour constructed as herein described, and provided with a reel, and stationary cant-boards, and movable cant-boards mounted on said stationary cant-boards, said movable cant-boards being provided at their upper edges with spring-arms which are connected with levers which are adapted to be operated by said reel, substantially as shown and described.

3. In a machine for bolting flour constructed as herein described, and provided with a reel, stationary cant-boards, and a conveyer or conveyers, supplemental movable cant-boards mounted on said stationary cant-boards, and provided with arms adapted to be engaged by lugs or projections on said reel, during a part of its revolution, substantially as and for the purpose described.

4. In a machine for bolting flour, constructed as herein described, and provided with a reel, stationary cant-boards, and a conveyer or conveyers, and supplemental movable cant-boards mounted on said stationary cantboards and adapted to be operated by said reel, said supplemental cant-boards being provided at their upper edges with arms which are connected with levers which are adapted to be operated by a roller secured to the casing of the reel, substantially as shown and described.

5. In a machine for bolting flour, constructed as herein described, and provided with a reel, stationary cant-boards, and a conveyer or conveyers, and supplemental movable cant-boards mounted on said stationary cant-boards and adapted to be operated by said reel, said supplemental cant-boards being provided at their upper edges with arms which are connected with levers which are adapted to be operated by a roller secured to the casing of the reel, and said supplemental cant-boards being provided at their upper edges with strips of canvas or similar material which are secured thereto, and to the frame of the machine, substantially as shown and described.

In testimony that I claim the foregoing as my invention I have signed my name, in presence of the subscribing witnesses, this 30th day of March, 1897.

ALEXANDER BOSANKO.

Witnesses:
C. GERST,
A. C. VAN BLARCOM.